(12) United States Patent
Reyderman

(10) Patent No.: US 12,008,320 B2
(45) Date of Patent: Jun. 11, 2024

(54) SYSTEM AND METHOD FOR EMAIL SIGNATURE EXTRACTION FROM UNSTRUCTURED TEXT

(71) Applicant: THE DUN & BRADSTREET CORPORATION, Short Hills, NJ (US)

(72) Inventor: Mikhail Reyderman, Austin, TX (US)

(73) Assignee: THE DUN AND BRADSTREET CORPORATION, Jacksonville, FL (US)

( * ) Notice: Subject to any disclaimer, the term of this patent is extended or adjusted under 35 U.S.C. 154(b) by 308 days.

(21) Appl. No.: 17/519,727

(22) Filed: Nov. 5, 2021

(65) Prior Publication Data

US 2022/0147714 A1 May 12, 2022

Related U.S. Application Data

(60) Provisional application No. 63/110,796, filed on Nov. 6, 2020.

(51) Int. Cl.
*G06F 40/205* (2020.01)
*G06F 16/2458* (2019.01)
(Continued)

(52) U.S. Cl.
CPC ........ *G06F 40/295* (2020.01); *G06F 16/2468* (2019.01); *G06F 40/205* (2020.01);
(Continued)

(58) Field of Classification Search
CPC ........ G06F 40/205; G06F 40/10; G06F 40/20; G06F 40/211; G06F 40/226;
(Continued)

(56) References Cited

U.S. PATENT DOCUMENTS 10,621,182 B2 4/2020 Scriffignano et al.
2012/0272206 A1* 10/2012 Sengupta .............. G06F 40/205
717/101

(Continued)

OTHER PUBLICATIONS

International Search Report dated Mar. 17, 2022 for PCT Appl. No. PCT/US2021/058167.
Written Opinion dated Mar. 17, 2022 for PCT Appl. No. PCT/US2021/058167.

*Primary Examiner* — Qi Han
(74) *Attorney, Agent, or Firm* — Ohlandt, Greeley and Perle, LLP

(57) ABSTRACT

There is provided a process for extracting contact data from a signature block in an unstructured text or email. The process includes (a) determining a position of a signature block candidate within the unstructured text or email, (b) validating patterns and sentence bounds and/or parts of speech detection in the signature block candidate, (c) using a pattern matcher to detect a business name candidate, (d) using an attribute parser to extract attributes of standard formats, (e) sending the extracted attributes to a structured contact profile data file, (f) using a fuzzy match model to determine if the business name candidate is a match to a pre-existing organization name, (g) assigning an attribute confidence score to the business name candidate, (h) sending the attribute confidence score to the structured contact data file, (i) extracting structured address information, and (j) sending the extracted address information to the structured contact data file.

7 Claims, 11 Drawing Sheets

(51) Int. Cl.
*G06F 40/295* (2020.01)
*G06Q 10/067* (2023.01)
*H04L 51/42* (2022.01)
*G06N 20/00* (2019.01)

(52) U.S. Cl.
CPC ........... *G06Q 10/067* (2013.01); *H04L 51/42* (2022.05); *G06N 20/00* (2019.01)

(58) Field of Classification Search
CPC .... G06F 40/237; G06F 40/253; G06F 40/258; G06F 40/279; G06F 40/295; G06F 40/49; G06F 40/55
USPC .................................. 704/9, 1, 4, 7, 10, 257
See application file for complete search history.

(56) References Cited

U.S. PATENT DOCUMENTS

| | | | |
|---|---|---|---|
| 2015/0302084 A1* | 10/2015 | Stewart | G06F 16/35 707/776 |
| 2016/0103877 A1* | 4/2016 | Ozcan | G06F 16/24532 707/714 |
| 2016/0203224 A1* | 7/2016 | Yu | G06Q 50/01 707/709 |
| 2018/0102938 A1 | 4/2018 | Yoon et al. | |
| 2019/0205302 A1 | 7/2019 | Lee et al. | |
| 2020/0004765 A1 | 1/2020 | Sørensen | |

* cited by examiner

Phillip, there are a number of alternative systems that will allow the same
level of energy efficiency. I would wait a bit for Wink's bid though. You
say that your panel costs are $20,000 additional. that sounds like a lot. I
just did a panel house with a 2100 sq ft footprint and the total panel cost
was about $25,000 with 8 inch walls and 10 inch roof. Stay in touch and we
can discuss alternatives if that becomes necessary. If your budget is $85-90
per sq. ft. excluding land costs your costs will be on the low end of the
true custom home level but should be achievable with good management.

```
#sig##name#Richard Morgan
#sig##title#Manager, Green Building Program
#sig##comp#Austin Energy
#sig##addr#721 Barton Springs Rd.
#sig##addr#Austin, TX 78704-1194
#sig###num#Ph. 512.505.3709
#sig###num#Fax 512.505.3711
#sig##email#e-mail richard.morgan@austinenergy.com
```

FIG. 3

| Body | Intro | Outro | Signature | Header | Text |
|---|---|---|---|---|---|
| 1.00 | 0.00 | 0.00 | 0.00 | 0.00 | Mask Frevert has purchased 4 tickets for the Houston Aeros 2001-02 season, for use by all business units, the same way as the Astros tickets. This is the Aeros first year in the American Hockey League. Their first game is on October 12th, go to http://www.aeros.com/schedule/ to see the full schedule. |
| 0.29 | 0.25 | 0.24 | 0.09 | 0.12 | |
| 0.89 | 0.00 | 0.00 | 0.03 | 0.09 | Our seats are located in Section 108, Row R, Seats 1-4. |
| 0.29 | 0.25 | 0.24 | 0.09 | 0.12 | |
| 0.99 | 0.00 | 0.00 | 0.01 | 0.00 | If your group is interested in using these tickets, please give me a call (x33497). |
| 0.29 | 0.25 | 0.24 | 0.09 | 0.12 | |
| 1.00 | 0.00 | 0.00 | 0.00 | 0.00 | In addition, I have 3 invitations (each admit 2 people) to the "Meet the Team Party" on Tuesday, 2nd October. If you would like to attend, please let me know. The party will be held at the Compaq Center from 6pm to 8pm. |
| 0.29 | 0.25 | 0.24 | 0.09 | 0.12 | |
| 0.00 | 0.02 | 0.98 | 0.00 | 0.00 | Regards, |
| 0.29 | 0.25 | 0.24 | 0.09 | 0.12 | |
| 0.34 | 0.15 | 0.24 | 0.17 | 0.10 | Nicki |
| 0.29 | 0.25 | 0.24 | 0.09 | 0.12 | |
| 0.29 | 0.25 | 0.24 | 0.09 | 0.12 | |
| 0.62 | 0.09 | 0.05 | 0.12 | 0.12 | Nicki Daw |
| 0.15 | 0.00 | 0.01 | 0.80 | 0.03 | Enron Corp |
| 0.01 | 0.00 | 0.00 | 0.99 | 0.00 | Tel: 713 853 3497 |
| 0.00 | 0.00 | 0.00 | 1.00 | 0.00 | Fax: 713 646 3330 |

FIG. 4

Annotator UI (1100)

| doccano-doccano | × | + |
| --- | --- | --- |

← → C  ⊕ 127.0.0.1:3000/projects/8/sequence-labeling

≡

⟩ PROJECTS  ⋮

1 of 3 <  >

Donald John Trump [Person] (born June 14, 1946) is the 45th and current president of the United States [Location] . Before entering politics, he was a businessman and television personality. Trump [Person] was born and raised in the New York City [Location] borough of Queens [Location] , and received a B.S. degree in economics from the Wharton School [Organization] at the University of Pennsylvania [Organization] . He took charge of his family's real-estate business in 1971, renamed it The Trump Organization [Organization] , and expanded its operations from Queens [Location] and Brooklyn [Location] into Manhattan [Location] . The company built or renovated skyscrapers, hotels, casinos, and golf courses. Trump [Person] later started various side ventures, mostly by licensing his name. He owned the Miss Universe [Misc] and Miss USA [Misc] beauty pageants from 1996 to 2015, and produced and hosted The Apprentice [Misc] , a reality television show, from 2003 to 2015. Forbes [Organization] estimates his net worth to be $3.1 billion.

| Key | Value |
| --- | --- |
| wikiPageID | 4848272 |
| Born | 1946 |
| Political party | Republican |
| Spouse | Melania Knauss |
| Parents | Fred Trump, Mary Anne MacLeod |
| Residence | White House |

*FIG. 11*

SYSTEM AND METHOD FOR EMAIL SIGNATURE EXTRACTION FROM UNSTRUCTURED TEXT

The present application is claiming priority of U.S. Provisional Patent Application Ser. No. 63/110,796, filed on Nov. 6, 2020, the entire content of which is herein incorporated by reference.

BACKGROUND

1. Field of the Disclosure

The present disclosure is directed to an extraction of data from an unstructured data source, and more specifically, the extraction of contact attributes, such as name, title, phone number, company name, address, website, and social media handles from unstructured email signature blocks.

2. Discussion of the Background Art

Trademarks used herein are the property of their respective owners.

Various companies have developed technology to capture leads and contacts automatically by checking incoming emails for contained contact information. That is, emails often contain signatures with contact information. As these signatures represent the company to the outside, they are usually up-to-date and a reliable source of contact information.

Most companies in this space primarily use rules-based extraction techniques, such as regular expression, aka regex, and cannot extract information at a high rate. One such company, i.e., GrinMark, uses the following process to extract email signatures: (1) machine learning model for detecting signature block in unstructured text, (2) dictionary lookups for distinguishing between a name, business name, title, etc., (3) regex parsing for standardized attributes (i.e., email, URL, phone), and (4) misses some of the emails in threads. SnapADDY claims 96% of lines detected by using (1) machine learning signature line detection, and (2) regex for attribute parsing. Still another company, i.e., Talon, claims to be correct 90% of the time by using (1) machine learning signature block detection and attribute annotation, (2) hardcoded parser based on assumptions about typical signature position and format. Still others use email app, such as outlook/Gmail application program interface (API) to only get the top email signature in a thread and ignore other signature data in unstructured form.

A problem is that most of these conventional systems primarily use rules-based extraction techniques (i.e., regex) which are not able to accurately extract signature block and contact attributes written in a wide variety of formats. Moreover, using humans to manually extract business card information is limited to approximately 100 emails per hour or less than 800 emails per day.

SUMMARY

The present disclosure enables the extraction of contact attributes, such as name, title, phone number, company name, address, website, and social media handles from unstructured email signature blocks, at a high rate.

One of the key aspects of the present disclosure is that it uses a combined approach of using regex, algorithms and machine learning (ML) to achieve the best accuracy and performance possible. For example, regex is used to quickly identify attributes of standard format, like email or uniform resource locator (URL) (i.e., no need to run an expensive ML model to do just that), and algorithms are used to quickly find string-based similarity in a fuzzy match. ML comes in to fill the gaps in case a regex rule cannot be used to accurately identify signal data just by doing pattern matching on strings, and extraction requires deeper "human-like" semantic understanding of text. ML is used only when required, as it is the most expensive in terms of compute resources, and a slow part of the process. That is, the present disclosure is uniquely designed to detect signature blocks in unstructured text, and extract structured contact attributes such as name, title, phone number, business name/address/website, social media handles, etc., from a signature block.

There is provided a process for extracting structured contact data from a signature block in an unstructured text or email. The process includes (a) receiving an unstructured text or email from a data source, (b) determining a position of a signature block candidate within the unstructured text or email, (c) validating patterns and sentence bounds and/or parts of speech detection in the signature block candidate, thereby determining that the signature block candidate comprises a valid signature line and is a detected signature block, (d) using a named entity recognition model with a pattern matcher to detect from the detected signature block a business name candidate and address line, (e) using an attribute parser to extract attributes of standard formats from at least one selected from the group consisting of: phone number, URL, email address and social media handle, thus yielding extracted attributes, (f) sending the extracted attributes to a structured contact profile data file, (g) using a fuzzy match organization name model to determine if the business name candidate is either an exact or close match to a pre-existing organization name database set, (h) assigning an attribute confidence score to the business name candidate, (i) sending the attribute confidence score to the structured contact data file, (j) extracting structured street, city, state and/or zip code from the address line, and (k) sending the extracted structure street, city, state and/or zip code to the structured contact data file.

There is also provided a system for extracting structured contact data from a signature block in an unstructured text or email. The system includes (i) a device that collects a signature block in an unstructured text or email and transmits the unstructured text or email, (ii) a first event-driven computing cloud service that routes (1) synchronous inputs of the unstructured text or email, and/or (2) asynchronous batch inputs of the unstructured text or email, and the asynchronous batch inputs are stored in a queue, (iii) a Hadoop cluster device that (a) receives the synchronous inputs directly from the first event-driven computing cloud service, and/or (b) pulls the asynchronous batch inputs from the queue, and the Hadoop cluster device includes a natural language processor that processes the unstructured text or email from the synchronous and/or asynchronous inputs so as to (c) extract contact data, and (d) scores the contact data, and (iv) a second event-driven computing cloud service that receives the extracted contact data and combines the scores from the Hadoop cluster device, thereby forming structured contact data.

The system also returns the structured contact data from the second event-driven computing cloud service to the Hadoop cluster device. The second event-driven computer cloud service (e.g., AWS Lambda) represents multiple tasks that can be run serverless (i.e., attribute regex parsing, lookup validation, name string parsing, combining results of previous processing steps, etc.). That is, in general anything can be offloaded from the server that runs expensive models to a less expensive AWS Lambda. The results from these serverless functions are then used to check validate attribute candidate against a regex or small set of filters or to resolve single string names into multiple fields in a contacts database (i.e., prefix, first, middle, last, and suffix). These results are typically used by the main process running on the server, for example, after we get first and last name attributes from a name string, we can validate these against large GCA and census person name reference sets. After all the processing is completed one of the secondary AWS Lambdas will combine results from all processing steps and generate the contact profile JavaScript Object Notation (JSON), i.e., a general purpose data format, that will be passed to a tertiary AWS Lambda that writes results to a plugin's batch output storage (i.e., S3 files that will be merged into a flat file and sent to GCA by the plugin code).

Further objects, features and advantages of the present invention will be understood by reference to the following drawings and detailed description.

BRIEF DESCRIPTION OF THE DRAWINGS

FIG. 3 is a model that predicts entire signature block position according to one signature block detector machine learning model according to Step 1 of FIG. 2.

FIG. 4 is another model that uses CNN (i.e., Convolutional Neural Network) to score probability of each line being body, introduction, signature or header according to Step 1 of FIG. 2.

FIG. 11 is an example of an annotator user interface (UI).

DETAILED DESCRIPTION OF THE PREFERRED EMBODIMENT

The present disclosure overcomes the deficiencies of the conventional email signature extraction systems by a unique combination of (a) a machine learning model trained on emails with annotated signature blocks which provides position of signature block candidates to extract a signature, (b) regular expressions (i.e., regex) to separate individual messages in an email thread by validating simple patterns such as the presence of a phone number or URL in the signature candidate detected by the machine learning model, (c) natural language processing (NLP) models for sentence bounds and parts of speech (POS) detection to validate POS patterns typically found in signature blocks to ensure that the signature block candidate contains all valid signature lines and no extra, (d) named entity recognition (NER) models to collect the contact name, job title and business name of the candidate, and (e) libpostal for extracting the address. Libpostal is a C library for parsing/normalizing international street addresses. Address strings can be normalized using expand_address which returns a list of valid variations so a user can check for duplicates in the user's dataset. It supports normalization in over 60 languages. An address string can also be parsed into its constituent parts using parse_address such as house name, number, city and postcode.

The present disclosure solves the technical problem of how to automatically extract contact names, addresses, phone numbers, titles and other attributes via the email signature block in an unstructured text or email at orders of magnitude faster than conventional systems using only rules-based extraction techniques, i.e., regular expressions.

There are a number of ways in which data scientists are able to extract information from unstructured text. One such example is disclosed in U.S. Pat. No. 10,621,182, entitled "System and Process for Analyzing, Qualifying and Ingesting Sources of Unstructured Data via Empirical Attribution", which is incorporated herein in its entirety. For example, (a) receiving data from a data source, (b) attributing the data source in accordance with rules, thus yielding an attribute, (c) analyzing the data to identify a confounding characteristic in the data, (d) calculating a qualitative measure of the attribute, thus yielding a weighted attribute, (e) calculating a qualitative measure of the confounding characteristic, thus yielding a weighted confounding characteristic, (f) analyzing the weighted attribute and the weighted confounding characteristic, to produce a disposition, (g) filtering the data in accordance with the disposition, thus yielding extracted data, and (h) transmitting the extracted data to a downstream process.

Figure 1:
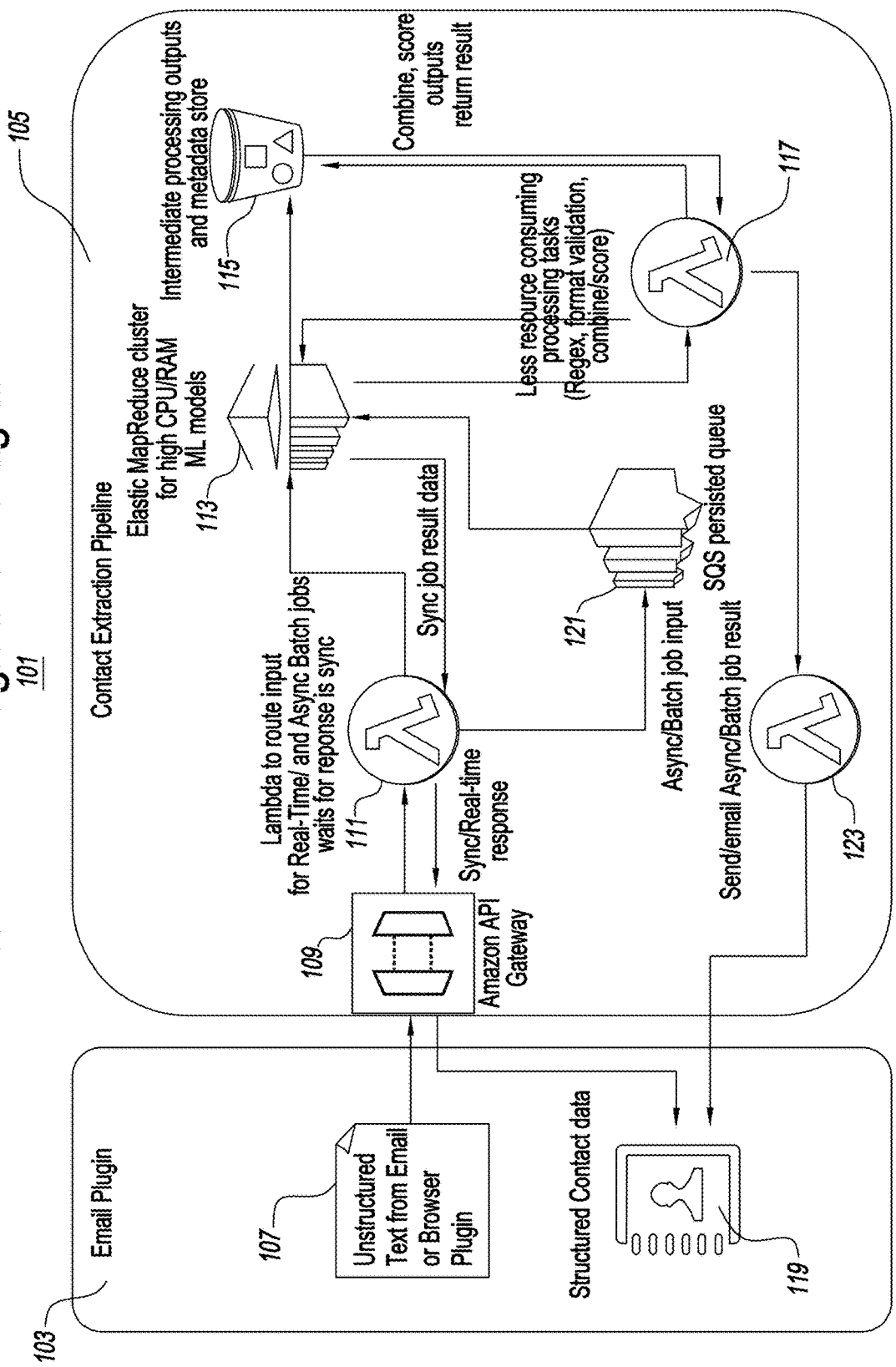
FIG. 1 is a schematic representation of a high-level infrastructure diagram according to the present disclosure.

The present disclosure can best be described by reference to the figures, attached hereto, wherein FIG. 1 is a high-level diagram of an infrastructure 101 according to the present disclosure. Infrastructure 101 comprises an email plugin unit 103 and a contact extraction pipeline unit 105. Plugin unit 103 collects unstructured text from an email or browser plugin 107 and transmits the unstructured text via an Amazon API gateway 109 to an AWS Lambda 111 to route input in real-time, and async batch jobs wait for response. Thereafter, the async batch jobs are sent to an AWS elastic mapreduce (EMR) cluster 113, hereinafter EMR cluster 113, for high CPU/RAM machine learning models, such as a hosted Hadoop framework running on a web-scale infrastructure. That is, EMR cluster 113 is a managed cluster platform that simplifies running big data frameworks, such as Apache Hadoop and Apache Spark. It can be viewed like Hadoop-as-a-Service. A user starts a cluster with the number of nodes the user wants, runs any job the user wants, and only pays for the time the cluster is actually up. The sync job result data which is processed in EMR cluster 113 is then sent to (1) an intermediate processing outputs and metadata store, referred to herein as metadata store 115, (2) an AWS Lambda 117 for less resource consuming processing tasks, the result of which are then sent to metadata store 115, and/or (3) AWS Lambda 111 for returning a sync/real-time response via Amazon API gateway 109 to structured contact data 119. AWS Lambda 111 also sends async/batch job results data to a Simple Queue Service (SQS) persisted queue 121 for transmission to EMR cluster 113. Alternatively, data from AWS Lambda 117 is returned to EMR cluster 113. AWS Lambda 117 is called from EMR cluster 113 to make calls to person name resolution and validation lookups and helpers that do not require much time to initialize, and resources to execute in order to unblock EMR threads for CPU/memory-intensive model evaluation and data transform operations of the main Spark job. Results of AWS Lambda 117 invocation are returned to the calling Spark job in EMR cluster 113 where they are used to produce the final output.

The Apache Sparks model referenced above can pertain to either (1) Apache Sparks, (i.e., data processing engine that runs on top distributed storage, like the one Hadoop provides); or (2) Spark NLP models which allow evaluation of the multiple NLP models (trained with Google's Tensorflow) used in this project to be run on a distributed Apache Spark cluster (deployed to EMR). Alternatively, one can be running the same or similar NLP models without the additional Apache Spark/Hadoop layer. This is what is occurring in an asynchronous flow that runs in the background to save on costs achieving the same result (i.e., daily batch processing). Since background processing can be run at regulated constant input load, we do not really need to pay for the extra "elastic" layer for real-time horizontal scalability to address spikes in synchronous requests initiated by plugin use. The synchronous/real-time use case is something that is only outlined in the infrastructure diagram as something we can address if necessary.

Anything can be run on a server, but that is not the best infrastructure choice for all tasks. Tasks like sending quick requests to external services or backend APIs, just like many other tasks/functions that are quick to initialize and not resource consuming, scales better serverless and are off-loaded to an AWS Lambda to achieve near linear scalability and free up resources on the server for tasks requiring a server (high CPU/GPU/RAM usage, several minutes to initialize). In general, decoupling the tasks with varying resource consumption and startup times is a good practice since it allows the use of optimal scaling techniques/resource types for each.

Thereafter, the processes and outputs from metadata store 115 are combined and delivered to AWS Lambda 117. Finally, AWS Lambda 117 transmits to an AWS Lambda 123, email async/batch job results, where it is sent to structured contact data 119. AWS Lambda 111 is part of a plugin codebase calls "get message" of a MS Graph API to collect daily email messages for all users (body.content path in the Graph API response). These email messages along with some origin metadata are then put on SQS persisted queue 121 to be processed. A Python SDK client code for MS Graph API was used (called from AWS Lambda 111 to the email plugin).

There are two pathways from AWS Lambda 111 to EMR cluster 113. The first is the real-time flow or top flow in infrastructure diagram FIG. 1, where email data is passed directly from AWS Lambda 111 to EMR cluster 113 for processing and caller AWS Lambda 123 is waiting on contact data results from Spark job in EMR cluster 113. The second pathway is the bottom flow, where an email message content received from MS Graph API is put on SQS persisted queue 121, and where the Spark job picks in EMR cluster 113 pulls unstructured email messages from SQS persisted queue 121 and processes them at a constant pace to extract contacts. SQS persisted queue 121 contains sensitive data that is encrypted for security purposes. The encryption does not affect contact extraction.

The scalability and security AWS infrastructure is an event driven processing pipeline for large data volumes. This infrastructure runs Tensorflow Python models within Apache Spark NLP job (EMR cluster 113) for horizontal scaling of machine learning.

JVM based (Java/Scala) solution for maximum scalability, distributed processing performance, enterprise-level security and availability of quality open-source large scale data processing/integration tools.

Memory and CPU intensive parts of Machine Learning pipeline are implemented using Apache Spark. Spark provides high performance real-time stream processing, graph and in-memory processing as well as batch processing with a standard interface. It provides automatic scaling based on load when deployed to EMR cluster 113. Spark NLP framework used is well integrated with Neural Network tools like TensorFlow (allows to choose any TF model and train/eval on Hadoop cluster at scale).

Less resource demanding tasks are performed by modules deployed to AWS Lambda (serverless). Auto-scales based on number API requests or queue messages received.

AWS API Gateway service interfaces are used for synchronous requests, job processing submission.

AWS SQS persisted queue for asynchronous/long running tasks to provide fault tolerance and auto-scaling for AWS Lambda serverless tasks.

Intermediate processing output and metadata are stored as objects on AWS S3.

Figure 2:
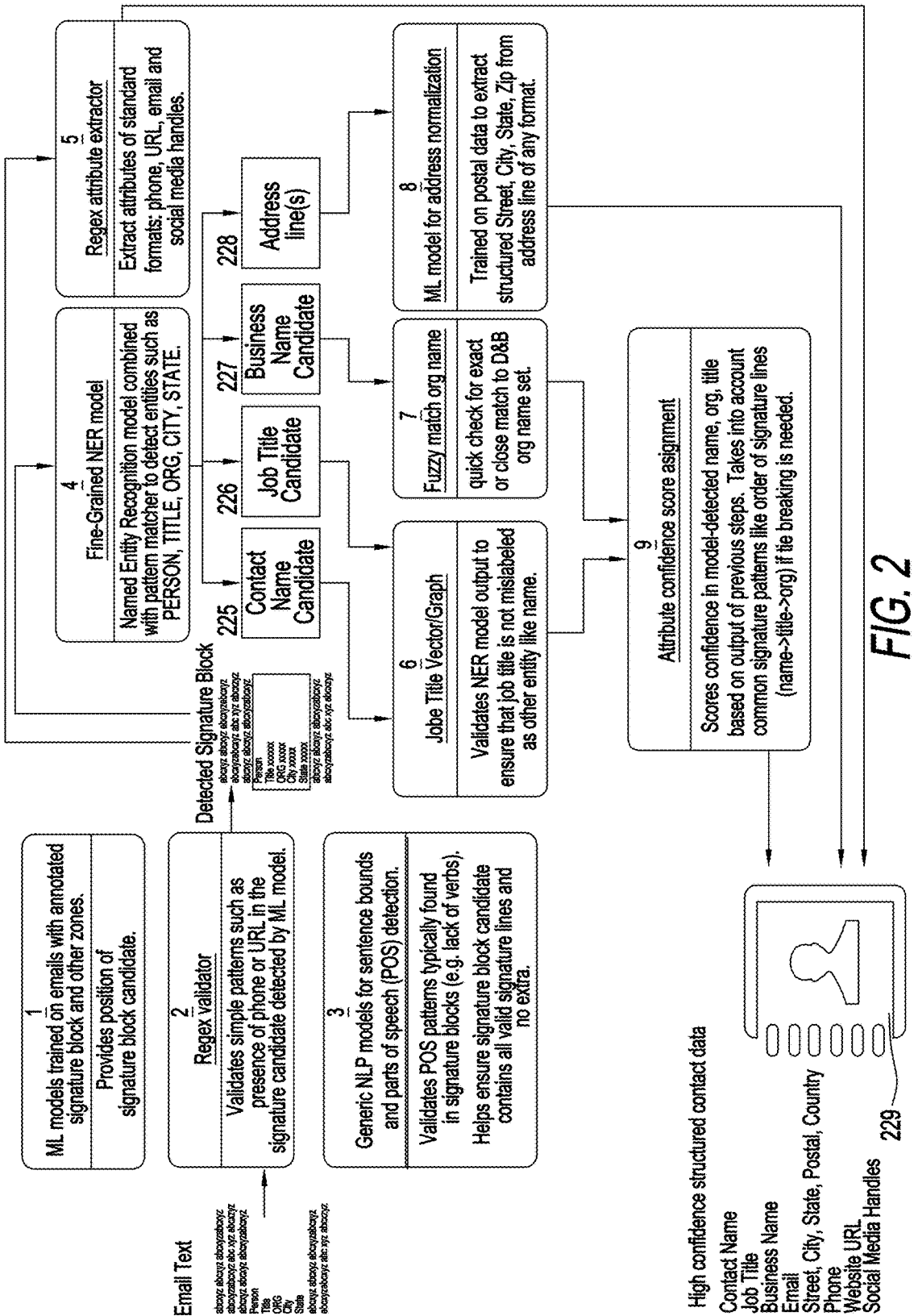
FIG. 2 is logic flow diagram of a data extraction/validation process according to the present disclosure.

FIG. 2 is a contact extraction high-level diagram (HLD), which depicts the data extraction/validation pipeline according to the present disclosure. That is, combining multiple approaches of using natural language processing (NLP) models with pre-defined parsing logic and attribute-specific knowledge graph/vector checks in order to detect signature and extract/validate contact attributes helps address the accuracy limitations of NLP annotator models (approximately 96% for most tasks) and edge-case handling limitations of pre-defined parser logic.

Unstructured email text is processed via a series of steps discussed below and in FIGS. 2-10, wherein:

Step 1 as shown in FIGS. 2-4 pertains to various signature block detector machine learning models used in the present disclosure. These examples are discussed in FIGS. 3 and 4.

FIG. 3 is a model that predicts entire signature block position according to one signature block detector machine learning model according to Step 1 of FIG. 2. FIG. 4 is another model that uses CNN (i.e., Convolutional Neural Network) to score probability of each line being body, introduction, signature or header according to Step 1 of FIG. 2. Model 1 below, as shown in FIG. 3, shows a document from an Enron train set and highlighted signature block guess that model made. Model 2 below, as shown in FIG. 4 shows a model scored email lines.

Such machine learning models are trained on emails with annotated signature blocks and other zones, and provide position of signature block candidates.

Model 1: Carvalho and Cohen, originally used in Jangada email parser tool. Predicts entire signature block position. Trained on annotated Enron email set.

Model 2: Repke, Krestel. CNN to score probability of each line being body, intro, outro, signature or header. Initially trained on ASF and Enron emails.

The below bullets discuss how Models 1 and 2 are used and how their training corpora can be improved.

Custom scoring logic that leverages outputs of the above models to produce high confidence signature line candidates.

Open source and allows training corpus extension and fine tuning.

Simple training set generation (see example of a train set document below). We can use the plugin output as additional training data to improve accuracy and edge case handling with minimal manual validation (see FIG. 7).

Step 2 is a regex validator which validates simple patterns, such as the presence of a phone or URL in the signature candidate detected by the machine learning model in Step 1 above.

Step 3 uses a generic natural language processor model for sentence bounds and parts of speech (POS) detection, as well as validates POS patterns typically found in a signature block (e.g., lack of verbs). This helps ensure that the signature block candidate contains all valid signature lines and no extra. The text is annotated with labels as shown in FIGS. 5 and 6.

Figure 5:
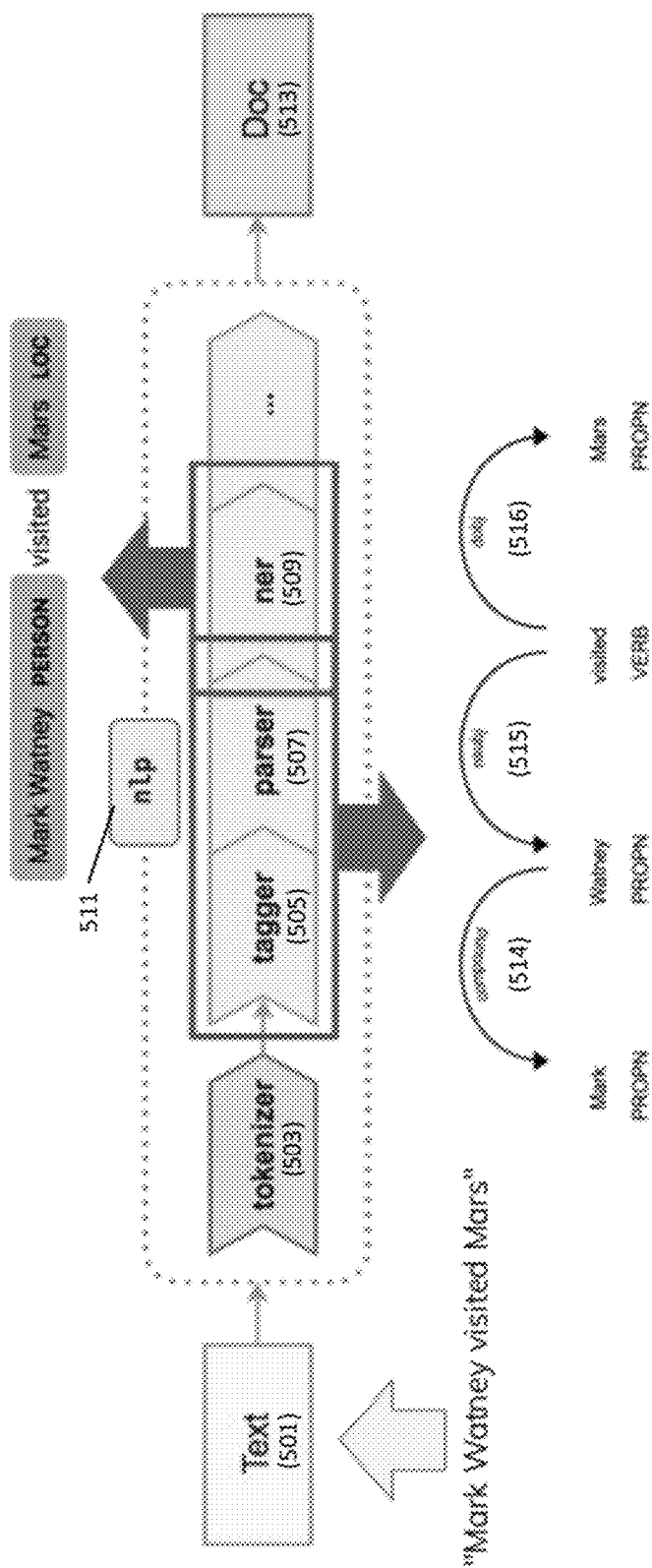
FIGS. 5 and 6 depict a natural language processing (NLP) machine learning pipeline for signature block and attributes detection according to Step 3 of FIG. 2.

FIG. 5 shows the standard Name Entity Recognition (NER) pipeline sequence and maps model which produces the labels. A tokenizer 503 simply splits text 501 "Mark Watney visited Mars" into words. The split text is then passed from tokenizer 503 to a tagger model 505 which adds "part of speech" tags "PROPN" to Mark, Watney and Mars, and "VERB" to visited in the annotated sentence example. A parser 507 produces lexical dependency graph (compound 514, nsubj 515, nobj 516 relationships between parts of speech from previous step). FIG. 6 shows an example of an email annotated with POS and lexical dependency parser models. This helps visualize the difference in annotation patterns between regular sentences and signature lines. The last model in the sequence is an NER 509 which assigns appropriate named entity labels (ORG, PERSON, LOCATION) to signature block words as discussed in bullets below. Together tokenizer 503, tagger 505, parser 507 and NER 509 make up a natural language process (NLP) 511 of the present disclosure which produces a Doc 513.

Figure 6:
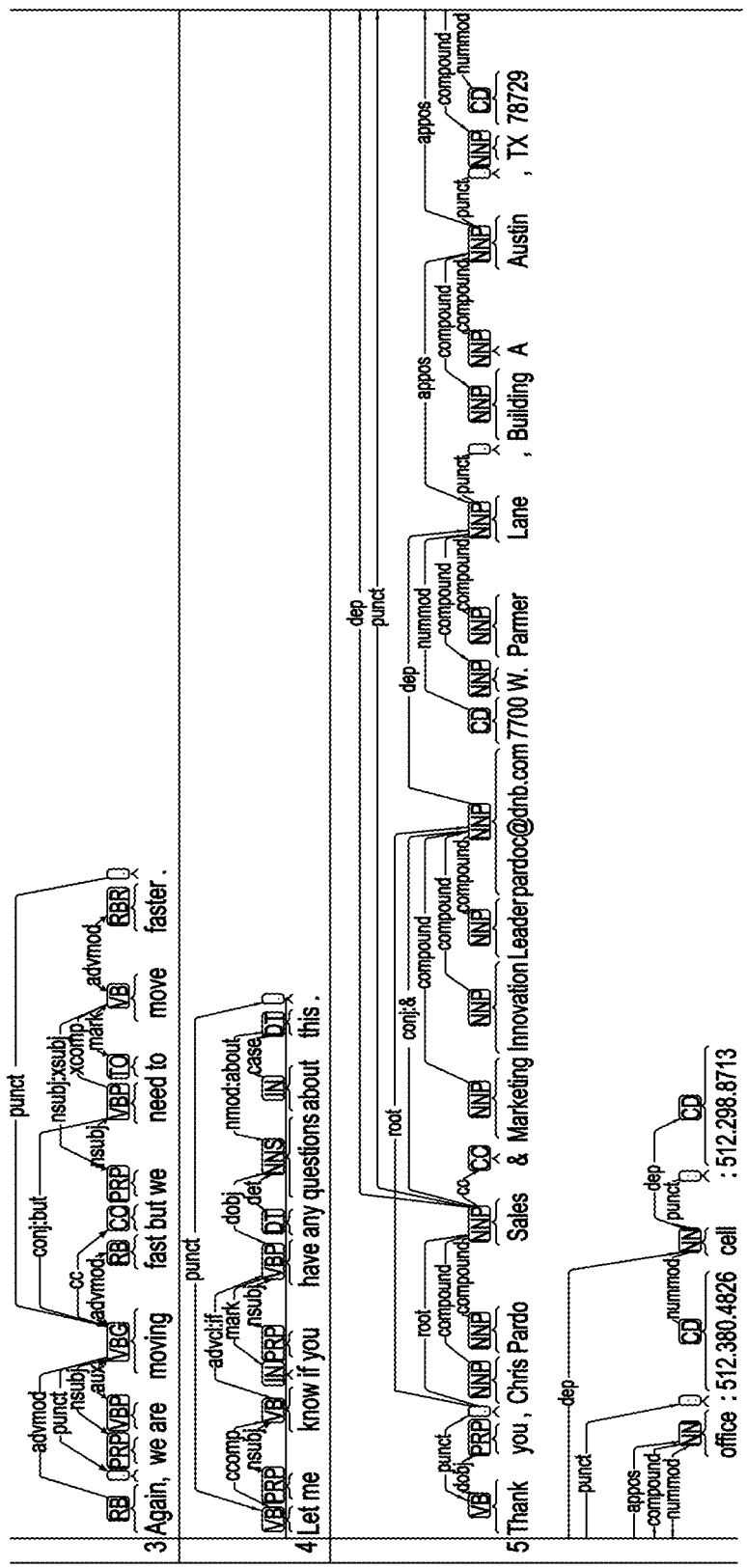

FIGS. 5 and 6 depict the natural language processing machine learning pipeline for signature block and attributes detection according to Step 3 of FIG. 2.

Sentence Detector and Parts of Speech (POS) allow deterministic validation of specific sentence and POS patterns that models trained on annotated email signatures do not. This is useful for providing higher accuracy and degree of confidence for signature detection when combined with email zones detection models.

Modern Natural Language Processing by NLP 511 with language embeddings like BERT, XLNet achieve high accuracy (>95%) on most tasks with default training corpus.

Named Entity Recognition models in NER 509 allow detection of at least ORG, PERSON and LOCATION entities.

Using NER annotation combiner and regular expressions provided by Stanford Core NLP on top of entity annotations allows to detect fine-grained entities such as TITLE (job), CITY, STATE, etc.

Sentence Detector, POS models are part of NER 509 upstream pipeline. No need to run multiple pipelines to take advantage of all useful NLP models for signature and attributes detection.

NLP processing artifacts produced for signature extraction are useful for enabling a variety of semantic, network and other content analysis cases like detecting relationships and events associated with specific named entities.

Spark NLP and Stanford NLP implementation allow to easily customize the model combinations and sequence as well as provide custom training sets and language embeddings. NER annotations generated on plugin email data can be used to extend and improve default training sets with minimal manual validation (see FIG. 7).

Figure 7:
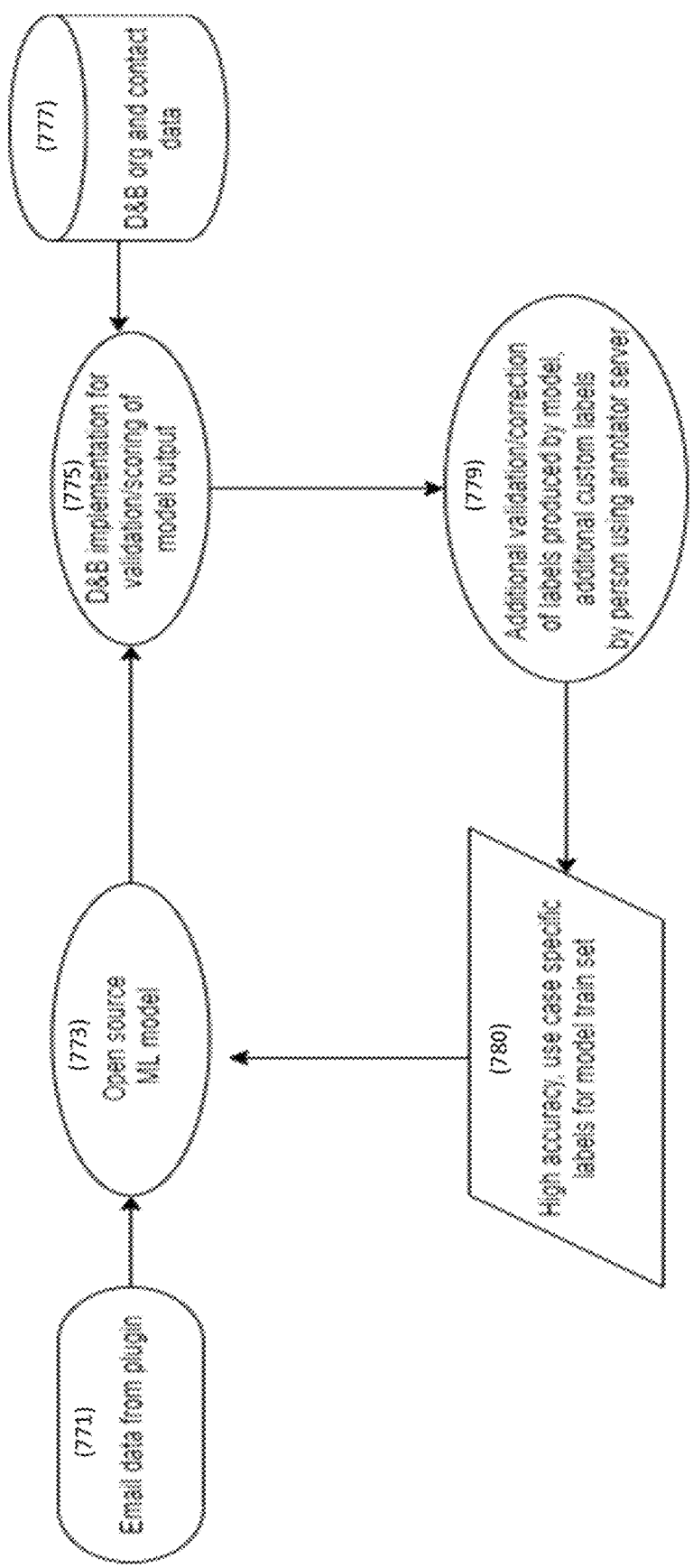
FIG. 7 is a logic flow diagram which depicts a continual machine learning model improvement when trained on a dataset that is specific to a particular use case.

FIG. 7 is a logic flow diagram which depicts the continual machine learning model improvement flow when trained on a dataset that is specific to a particular use case.

Leverages existing models output for email signature block detection and NER train sets improvement.

Models produce higher accuracy/recall predictions when trained on dataset that is specific to our use case and is larger than the default one provided with open source implementation.

Significantly increases (potentially order of magnitude) train set size allowing greater accuracy and edge case coverage for signature block detection models (default training sets contain fewer than 1000 examples from Enron and ASF archives).

Improves entity type detection within signature block (person, org, title, location). Simplifies generation of additional training corpus containing custom label types such as "department".

The continual machine learning model receives email data 771 from plugin unit 103 in FIG. 1. Email data 771 is then processed via a machine learning model 773, for example:

Talon—uses a model very similar to the first model used with the example in FIG. 3, uses the same Enron train set; and Quagga—model 2, FIG. 4, uses the CNN version of this model trained on ASF email archive.

The general-purpose NLP models discussed above, specifically NER, are very useful for extracting email data. The output of contact extraction is used as train data for models used by contact extraction itself in continuous automated iterations. The use of its own output for train set allows scaling the size of the train set. This also allows making the model train set more specific to the problem that is being solved and the type of inputs being processed, which contributes to quicker model accuracy improvement. Thus, the entire process of "contact extractor" (consensus between all the models and custom validation code) is being used to improve the individual models that it uses. The more data is processed and extracted, the more accurate it's ML models become by virtue of continuously increasing validated domain-specific train sets and retraining the models on these sets. In context of continual improvement, we will be improving the signature block detector model (using correctly identified and validated blocks for train set) and NER (using annotations generated to produce valid contacts as well as some manually generated ones for better edge case coverage).

The output from machine learning model 773 is then validated and scored by a validation/scoring model 775. During the validation and scoring of the output from machine learning model 773, validation/scoring model 775 utilizes organization and contact data from a storage library 777. There are two main types of automated validation for NER model:

1) Regex and string format. For example, a string that contains a business suffix or multiple consecutive digits is likely not a job title (but occasionally could be labeled as such by NER model because it saw some words similar to titles in its' initial train set).

2) Reference dataset validation. For example, one could check if a string labeled as job title matches or is similar enough (i.e., fuzzy-match score of 0.66 or higher) to any of the titles in a contacts database, e.g., a database containing business contact records. That helps filter out incorrect labels that cannot be detected using just format/regex validation. Similarly, if you get a match with person or org name in D&B reference set when validating string labeled "job title" by the model, this would raise a flag for a potentially incorrect label. The validation and scoring output, i.e., additional validation/correction of labels produced by the validation/scoring model 775, are then processed via an annotator 779 to produce additional custom labels. A person would use the tool (typically called annotator server) that loads labeled text generated by the current iteration of the model (that also passed some of the automated validation in validation/scoring model 775) and corrects them if necessary and/or adds custom named entity labels such as "Department".

FIG. 11 is an example of an annotator user interface (UI), namely annotator UI 1100. Manually adjustable colored labels correspond to named entities.

Thereafter, annotator 779 processes additional custom labels to generate high accuracy, use case specific labels for a model training set 780. Labels are generated by the NER pipeline models (FIG. 2, Step 4) details in FIG. 5. Optionally, for a train set of the next iteration of NER model, one could envision the use of labels generated when processing emails where valid contact data in a signature is found. Custom label (named entity) types that were not present in a NER model (did not exist in train set) can be added manually using annotator UI 1100.

The model train set is then feed back to the machine learning model 773.

NER (FIG. 2, step 4) is one of the ML models that is being improved by the operations shown in FIG. 7. This model is being used as an example to describe the process of continuous model improvement.

The following signature string is an example of the process flow in FIG. 7.

Email data 771 from plugin 103 can be for example: "Chris Pardo\nSales & Marketing Innovation Leader\npardoc@dnb.com\n7700 W. Parmer Lane, Building A\nAustin, TX 78729\noffice: 512.380.4826\ncell: 512.298.8713".

Thereafter, machine learning model 773 is applied to the above string resulting in the following:

```
"entitymentions": [
    {
        "text": "Chris Pardo",
        "characterOffsetBegin": 4,
        "characterOffsetEnd": 15,
        "ner": "PERSON"
    },
    {
        "text": "Sales & Marketing",
        "characterOffsetBegin": 17,
        "characterOffsetEnd": 50,
        "ner": "ORG"
    },
    {
        "text": "Leader",
        "characterOffsetBegin": 52,
        "characterOffsetEnd": 58,
        "ner": "TITLE"
    },
    {
        "text": "pardoc@dnb.com",
        "characterOffsetBegin": 61,
        "characterOffsetEnd": 75,
        "ner": "EMAIL"
```

-continued

```
    },
    {
        "text": "n7700",
        "characterOffsetBegin": 76,
        "characterOffsetEnd": 81,
        "ner": "NUMBER",
        "normalizedNER": "7700.0"
    },
    {
        "text": "W. Parmer Lane",
        "characterOffsetBegin": 82,
        "characterOffsetEnd": 96,
        "ner": "PERSON"
    },
    {
        "text": "TX",
        "characterOffsetBegin": 118,
        "characterOffsetEnd": 120,
        "ner": "STATE_OR_PROVINCE"
    },
    {
        "text": "78729",
        "characterOffsetBegin": 121,
        "characterOffsetEnd": 126,
        "ner": "NUMBER",
        "normalizedNER": "78729.0"
    },
    {
        "text": "512.380.4826",
        "characterOffsetBegin": 137,
        "characterOffsetEnd": 149,
        "ner": "NUMBER"
    },
    {
        "text": "512.298.8713",
        "characterOffsetBegin": 162,
        "characterOffsetEnd": 174,
        "ner": "NUMBER"
    }
],
```

Then the process runs validation on lines containing org and TITLE and ORG using first exact match (basic lookup) on D&B set of org names/tradestyles and job titles. The process also applies basic regex validation to see if we can quickly find a business suffix which is a good indicator of ORG entity.

As the result, attribute candidate line "Sales & Marketing Leader" gets a direct match on D&B job titles set. The attribute line then gets labeled as title instead of org. If we didn't get exact match, we would utilize fuzzy-match as outlined above to see if the attribute candidate is similar to enough D&B set of titles or org name and then correct the entity type label if needed.

A person loads extracted, auto-validated and adjusted (if needed) additional custom labels from annotator 779 into annotator UI 1100. At this point we have "Sales & Marketing Leader" attribute labeled correctly as title. The reviewer examines the remaining labels and notices a mislabel:

```
    {
        "text": "W. Parmer Lane",
        "characterOffsetBegin": 82,
        "characterOffsetEnd": 96,
        "ner": "PERSON"
    },
```

A reviewer then manually corrects the label via annotator UI 1100.

```
"text": "W. Parmer Lane",
    "characterOffsetBegin": 82,
    "characterOffsetEnd": 96,
    "ner": "ADDRESS"
},
```

Annotator 779 then saves all validated and corrected labels for this signature in a CoNLL formatted document that will then be used in model training set 780 for the new iteration of machine learning model in 773, e.g., NER.

We can potentially reuse the same flow as in FIG. 7 for signature block detection model. We would similarly use a combination of automated signature block validation described above and manual correction. Since we only need a few thousand additional examples specific to our use-case/domain to improve the models, it is feasible to manually review all new training documents needed for a new iteration of the model in a few person/days.

Person name, org name and title labels are validated against a reference set of contact and org data using fuzzy match as well as exact match. That is, the system initially looks for an exact match, and if there is no exact match, then the system seeks a fuzzy match score (provided by fuzzy match implementation) for title candidate, org name. An exact match or fuzzy match score above 0.7 (out of 1.0), is considered NER label acceptable. The sequence of detected attributes is also taken into consideration in validation. For example, if the system gets multiple non-consecutive lines with the same NER label or if an annotations position is not in line with common signature line sequences (e.g., org and title precede person name). After the automated validation/scoring is done, there is an additional manual validation step before the system adds generated annotations to the train set for model improvement. The manual validation consists of inspecting resulting contact. If extracted contact attributes look correct (no email msg data, no mislabeled attributes), then the system flags it as the record to use for the signature block detector model output produced for this record as new train set document for that model. For NER model, using similar approach of selecting model outputs that lead to correct contact, the system would load the generated annotations into an annotator tool. In the annotator tool, the validator would see signature text with NER labels on top that they would correct if necessary. The same tool would also be used to extend the set of NER labels (add DEPARTMENT type in addition to TITLE).

FIG. 2, Step 4 involves the processing of the detected signature block from Steps 1-3 via a fine-grained NER model combined with a pattern matcher to detect entities such as person, title, organization, city and state. That is, the NER model generates contact name candidate 225, job title candidate 226, business/organization name candidate 227 and address line(s) 228.

Simultaneously, FIG. 2, Step 5 utilizes a Regex attribute parser to extract attributes of standard formats, e.g., phone number, URL, email address and social media handles. These attributes are then included in a high confidence structured contact data output, namely structured contact data 229.

FIG. 2, Step 6 pertains to a fuzzy match which validates NER model output to ensure that job title is not mislabeled as other entity like names. For example:

Job title in signature is an important attribute that allows to generate useful contact/dataset recommendations within email plugin as well as make contact data more accurate and actionable in a variety of use-cases.

Dictionary lookup approach of validating titles that some competitors have limited effectiveness because not all possible titles and their permutations will get a direct match that is required. There is no way to check if title candidate 26 that is being validated is similar enough to those that exist in validation dataset and therefore is valid.

Leveraging fuzzy match based on a large D&B reference set of org names and titles is useful for quick additional validation in cases where NER model misses a label or assigns incorrect one to a signature attribute like org name/job title/department or there is no way to differentiate between title/org name based on pre-defined patterns like presence business suffix or exact match on org name and job title. Fuzzy match allows us to say if an attribute is similar enough to either org name or job title.

A fuzzy-match is used in FIG. 2, Step 6 to answer the question "Is detected title/org/name candidate similar to any of the ones in a known database of corporate entities".

FIG. 2, Step 7 pertains to a fuzzy match of organization names from business name candidate 227, i.e., a quick check for exact or close match from a stored library of organizational name set. That is, Step 7 uses business name, trade style and contact title data to build fuzzy match reference sets. It thereafter performs exact, N-gram token and nearest neighbor and Soundex match to see if a given string matches to a set of contact titles GCA or organization names/trade styles World base. It is used to validate, and correct invalid ORG/TITLE entity annotations produced by NER model based on fuzzy match scores produced using the flow described in FIG. 8. When trying to validate if a string labeled as job title by NER model is similar to any of the known titles we would get the following results:

```
input 1:
"Client Engagement Manager"
output 1:
{{[{'Client Engagement Manager'}]}=[Match{data={[{'Client Engagement Manager'}]},
matchedWith={[{'Client Services Manager'}]}, score=0.6666666666666666},
Match{data={[{'Client Engagement Manager'}]}, matchedWith={[{'Engagement Team
Manager'}]}, score=0.6666666666666666.....
input 2:
"Baker Hughes"
output 2:
{{[{'Baker Hughes'}]}=[Match{data={[{'Baker Hughes'}]}, matchedWith={[{'Baker'}]},
score=0.32}]}
```

The second example is below the validation threshold of 0.67 which means it did not find similar enough titles, so it is possible that NER labeled business name as title by mistake.

Figure 8:
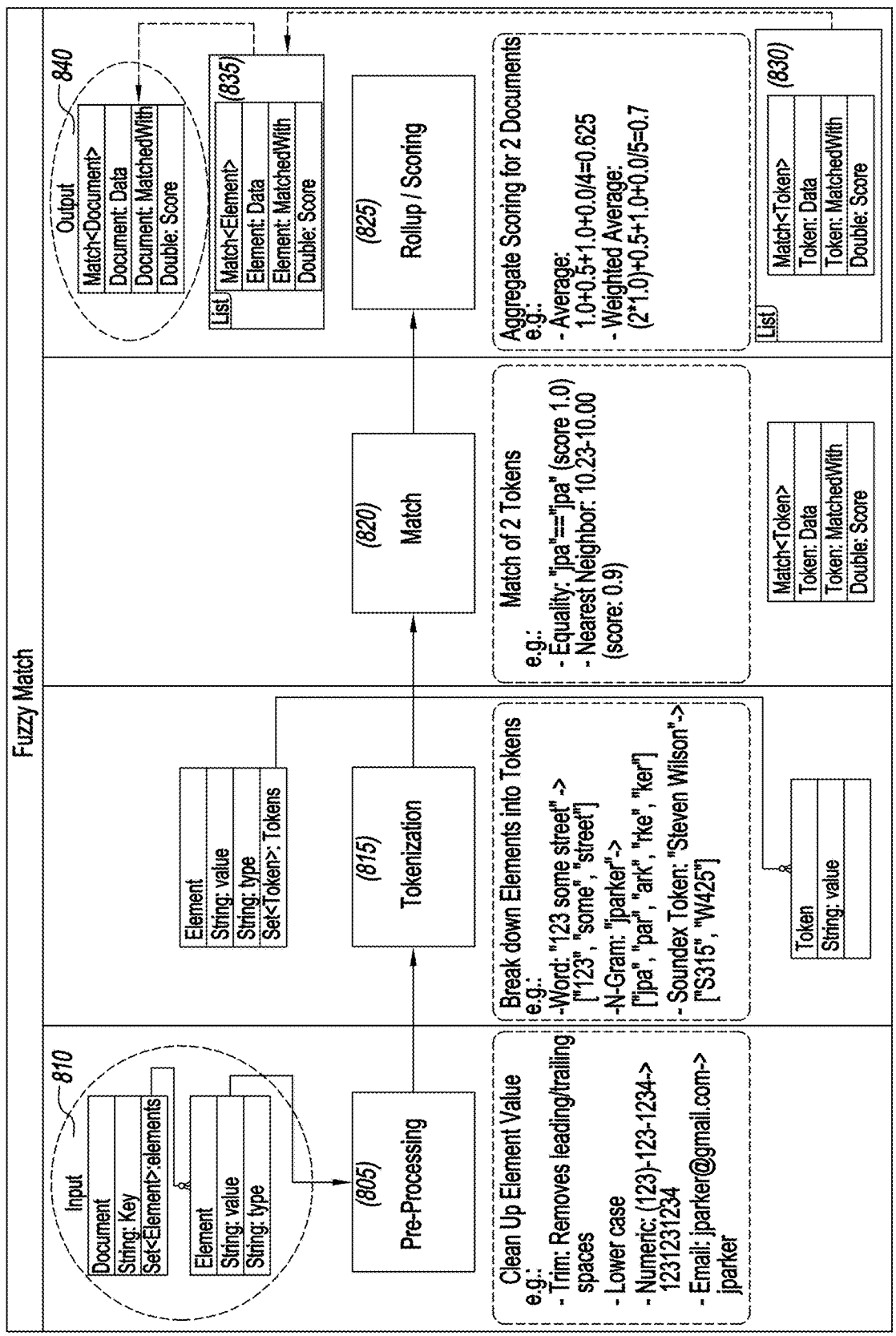
FIG. 8 is a logic flow diagram which provides for a fuzzy match validation for title and organization names according to Step 7 of FIG. 2.

FIG. 8 shows how internal implementation of a fuzzy-matcher generates match scores. FIG. 8 includes pre-processing 805 of inputs 810 to clean up element values, e.g., Trim: removes leading/trailing spaces, lower case; numeric—(123)-123-1234→1231231234; and email: jparker@gmail.com→jparker.

Thereafter, the pre-processed and cleaned up element values are sent for tokenization 815, wherein the elements are broken down into tokens, e.g., Word: "123 some street"→("123", "some", "street"), N-Gram" "jparker"→ ("jpa", "par", "ark", "rke", "ker"), and Soundex token: "Steven Wilson"→("S315", "W425").

The broken down elements into tokens from tokenization 815 are then sent to match 820, wherein a match of 2 tokens occurs, e.g., equality. "jpa"=="jpa" (score 1.0), and nearest neighbor: 10.23-10.00 (score: 0.9). The match information is then sent to rollup/scoring 825 wherein the aggregate scoring of 2 documents occurs, e.g., Average: 1.0+0.5+1.0+0.0/4=0.625; and weighted average: (2*1.0)+0.5+1.0+0.0/5=0.7. Thereafter, a list 830 of token data, token matched with rollup/scoring 825 is merged with a list 835 of element data, element matched with rollup/scoring 825, thereby generating an output 840 of document data, document matched with and assigned a double value as score.

Figure 9:
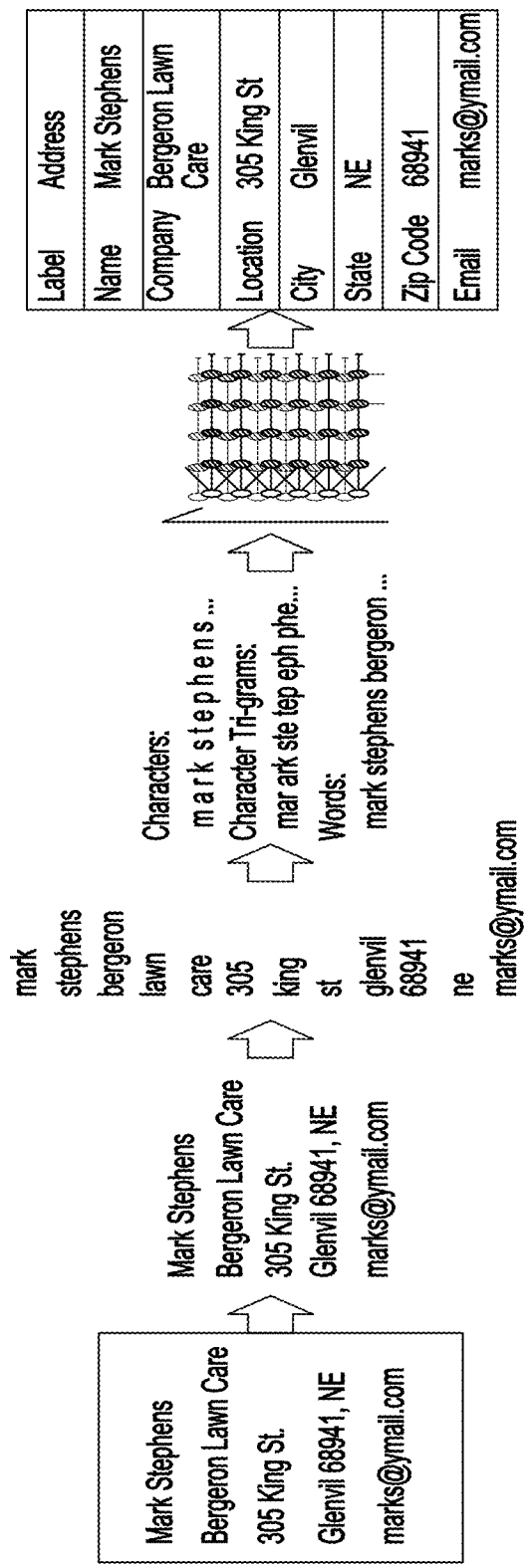
FIG. 9 depicts a machine learning model for physical address normalization according to Step 8 of FIG. 2.

FIG. 2, Step 8 processes address line(s) 228 via a machine learning model for address normalization. That is, address normalization is trained on postal data to extract structured street, city, state, and zip code from address line(s) 228 in any format. FIG. 9 is a preferred example of a machine learning model for physical address normalization for use in Step 8. FIG. 9 shows internal implementation of a libpostal project (i.e., tokenization, 3-grams, encoding and prediction) based on address example. The location or address line(s) is sent (in any format found in email signatures) to libpostal and get its prediction for structured address fields (street, city, state, postal) or example given input "305 King St Glenvil 68941, NE" it would return

```
{
    "label": "house_number",
    "value": "305"
},
{
    "label": "road",
    "value": "King St"
},
{
    "label": "city",
    "value": "Genvil"
},
{
    "label": "state",
    "value": "NE"
}
```

Email signatures typically contain address written in 1-2 lines. Since the same address can be written in a number of different ways, there is no way to accurately parse out specific attributes using pre-defined logic/regex, especially for international addresses. A machine learning model, e.g., libpostal, trained on a large set of standardized addresses helps solve this in an efficient and maintainable way.

Extracting specific address attributes like building number, street, city, province allows the contact record to be used for match/criteria search of org/contact, thereby allowing it to be verified/updated and included in automated solutions that take advantage of business location data.

Libpostal project appears to be the only well developed and maintained open-source solution in this area. It allows use of custom training data to default accuracy. Libpostal uses a model trained on labeled (i.e., street, city, province, etc.) address strings from various languages and locales. It uses public address database of over 100 GB as source.

Optionally, the address normalization of libpostal generates a structured address line which is then transmitted to structured contact data 229.

FIG. 2, Step 9 generates an attribute confidence score assignment based upon data received from the fuzzy match for title, organization and name of Step 6 and the fuzzy match organization name of Step 7. The confidence score assignment takes into account common signature patterns like order of signature lines (name>title>organization) if tie breaking is needed. Such name, title and organization are then provided to structured contact data 229.

Figure 10:
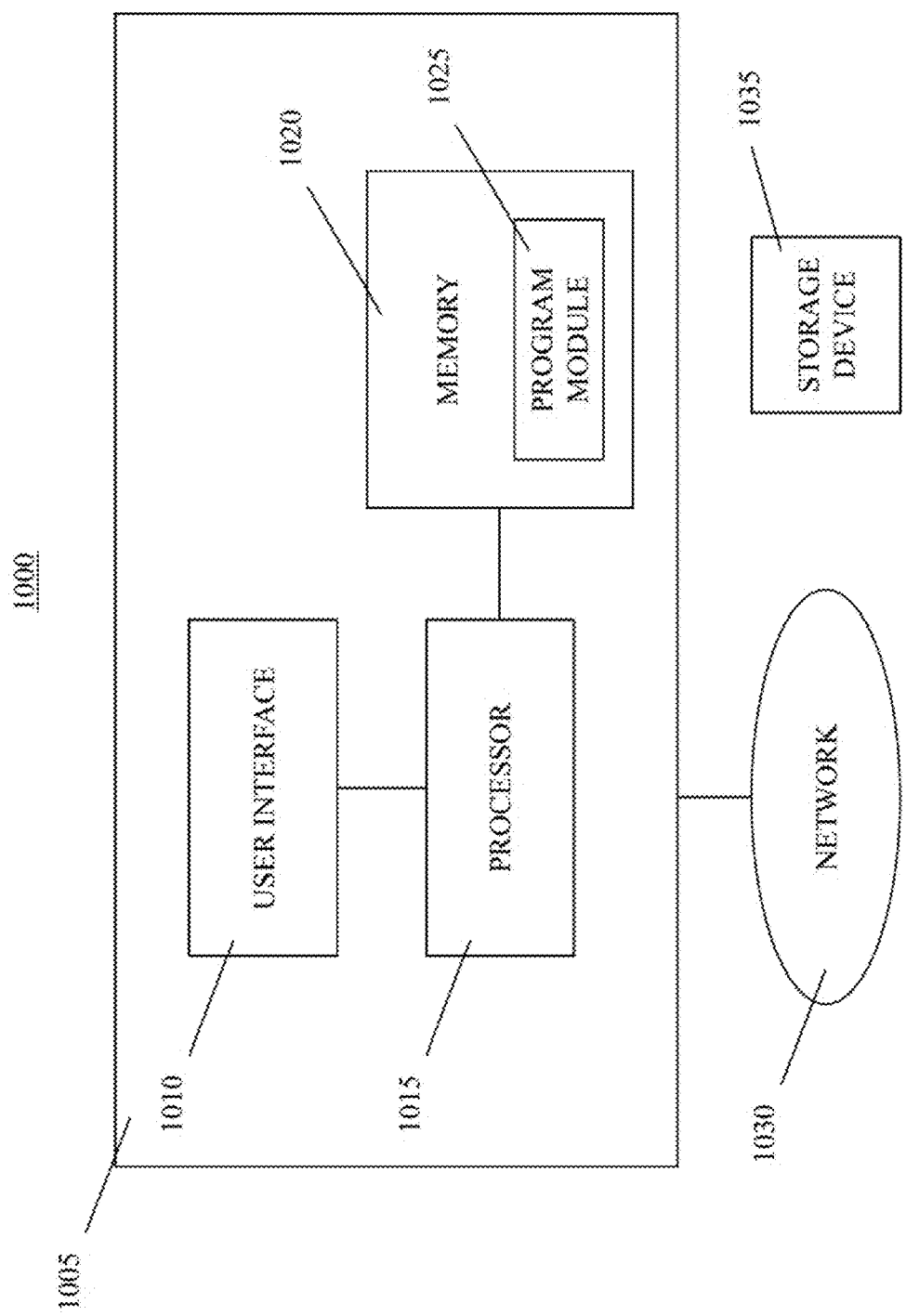
FIG. 10 is a block diagram of a computer system used to run the data extraction/validation process according to the present disclosure.

FIG. 10 is a block diagram of a computer system, namely system 1000, that performs the data extraction/validation process according to the present disclosure. System 1000 includes a computer 1005 coupled to a network 1030, e.g., the Internet.

Computer 1005 includes a user interface 1010, a processor 1015, and a memory 1020. Although computer 1005 is represented herein as a standalone device, it is not limited to such, but instead can be coupled to other devices (not shown) in a distributed processing system via network 1030.

Processor 1015 is configured of logic circuitry that responds to and executes instructions.

Memory 1020 stores data and instructions for controlling the operation of processor 1015. Memory 1020 may be implemented in a random-access memory (RAM), a hard drive, a read only memory (ROM), or a combination thereof. One of the components of memory 1020 is a program module 1125.

Program module 1025 contains instructions for controlling processor 1015 to execute the methods described herein. For example, as a result of execution of program module 1025, processor 1015 provides for receiving the signature block in an unstructured text or email from a data source; determining a position of the signature block candidate within the unstructured text or email; validating patterns in the signature block candidate; validating sentence bounds and/or parts of speech detection that are typically found in the signature blocks, thereby determining that the signature block candidate comprises at least a valid signature line and is a detected signature block; using a named entity recognition model with a pattern matcher to detect from the detected signature block at least one candidate from the group consisting of: contact name candidate, job title candidate, business name candidate and address line; using an attribute parser to extract attributes of standard formats from at least one selected from the group consisting: phone number, URL, email address and social media handle; sending the extracted attributes to a structured contact data file; using a fuzzy match organization name model to determine if the business name candidate is either an exact or close match to a pre-existing organization name database set; assigning an attribute confidence score to each of the contact name candidate, the job title candidate, and the business name candidate; sending the attribute confidence score from step (i) to the structured contact data file; extracting structured street, city, state and/or zip code from the address line; and sending the extracted structure street, city, state and/or zip code to the structured contact data file.

The term "module" is used herein to denote a functional operation that may be embodied either as a stand-alone component or as an integrated configuration of a plurality of sub-ordinate components. Thus, program module 1025 may be implemented as a single module or as a plurality of modules that operate in cooperation with one another. Moreover, although program module 1025 is described herein as being installed in memory 1020, and therefore being implemented in software, it could be implemented in any of hardware (e.g., electronic circuitry), firmware, software, or a combination thereof.

User interface 1010 includes an input device, such as a keyboard or speech recognition subsystem, for enabling a user to communicate information and command selections to processor 1015. User interface 1010 also includes an output device such as a display or a printer. A cursor control such as a mouse, track-ball, or joystick, allows the user to manipulate a cursor on the display for communicating additional information and command selections to processor 1015.

Processor 1015 outputs, to user interface 1010, a result of an execution of the methods described herein. Alternatively, processor 1015 could direct the output to a remote device (not shown) via network 1030.

While program module 1025 is indicated as already loaded into memory 1020, it may be configured on a storage medium 1035 for subsequent loading into memory 1020. Storage medium 1035 can be any conventional storage medium that stores program module 1025 thereon in tangible form. Examples of storage medium 1035 include a floppy disk, a compact disk, a magnetic tape, a read only memory, an optical storage media, universal serial bus (USB) flash drive, a digital versatile disc, or a zip drive. Alternatively, storage medium 1035 can be a random-access memory, or other type of electronic storage, located on a remote storage system and coupled to computer 10105 via network 1030.

While I have shown and described several embodiments in accordance with my invention, it is to be clearly understood that the same may be susceptible to numerous changes apparent to one skilled in the art. Therefore, I do not wish to be limited to the details shown and described but intend to show all changes and modifications that come within the scope of the appended claims.

What is claimed is:

1. A process for extracting structured contact data from a signature block in an unstructured text or email, said process comprising:
   (a) receiving an unstructured text or email from a data source;
   (b) determining a position of a signature block candidate within said unstructured text or email;
   (c) validating patterns and sentence bounds and/or parts of speech detection in said signature block candidate, thereby determining that said signature block candidate comprises a valid signature line and is a detected signature block;
   (d) using a named entity recognition model with a pattern matcher to detect from said detected signature block a business name candidate and address line;
   (e) using an attribute parser to extract attributes of standard formats from at least one selected from the group consisting of: phone number, URL, email address and social media handle, thus yielding extracted attributes;
   (f) sending said extracted attributes to a structured contact profile data file;
   (g) using a fuzzy match organization name model to determine if said business name candidate is either an exact or close match to a pre-existing organization name database set;
   (h) assigning an attribute confidence score to said business name candidate;
   (i) sending said attribute confidence score to said structured contact data file;
   (j) extracting structured street, city, state and/or zip code from said address line; and
   (k) sending said extracted structure street, city, state and/or zip code to said structured contact data file.

2. A system for extracting structured contact data from a signature block in an unstructured text or email, said system comprising:
   a device that collects a signature block in an unstructured text or email and transmits said unstructured text or email;
   a first event-driven computing cloud service that routes (1) synchronous inputs of said unstructured text or email, and/or (2) asynchronous batch inputs of said unstructured text or email, wherein said asynchronous batch inputs are stored in a queue;
   a Hadoop cluster device that (a) receives said synchronous inputs directly from said first event-driven computing cloud service, and/or (b) pulls said asynchronous batch inputs from said queue, wherein said Hadoop cluster device includes a natural language processor that processes said unstructured text or email from said synchronous and/or asynchronous inputs so as to (c) extract contact data, and (d) scores said contact data; and
   a second event-driven computing cloud service that receives said extracted contact data and combines said scores from said Hadoop cluster device, thereby forming structured contact data.

3. The system according to claim 2, wherein said second event driven computing cloud returns said structured contact data to said Hadoop cluster device.

4. The system according to claim 2, wherein said second event-driven computing cloud service performs at least one task selected from the group consisting of: attribute regex parsing, lookup validation, name string parsing, and combinations thereof.

5. The system according to claim 4, wherein said second event-driven computing cloud service uses a result from said task to validate an attribute candidate against a regex or small set of filters, or to resolve single string names into multiple fields, thereby generating first and last name attributes.

6. The system according to claim 5, wherein said second event-driven computing cloud service validates said first and last name attributes from a name string against person name reference sets.

7. The system according to claim 5, further comprising a third event-driven computing cloud service,
- wherein said second event-driven computing cloud service combines results from previous processing steps to generate said structured contact data, and passes said structured contact data to said third event-driven computing cloud service, and
- wherein said third event-driven computing cloud service stores the structured contact data in a file.

* * * * *